(12) United States Patent
Kleven

(10) Patent No.: US 9,188,489 B2
(45) Date of Patent: Nov. 17, 2015

(54) TWISTED SENSOR TUBE

(75) Inventor: Lowell A. Kleven, Eden Prairie, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 13/537,817

(22) Filed: Jun. 29, 2012

(65) Prior Publication Data

US 2013/0142216 A1    Jun. 6, 2013

Related U.S. Application Data

(60) Provisional application No. 61/565,765, filed on Dec. 1, 2011.

(51) Int. Cl.
*G01K 1/08* (2006.01)
*G01K 13/02* (2006.01)

(52) U.S. Cl.
CPC ............ *G01K 1/08* (2013.01); *G01K 13/02* (2013.01); *Y10T 29/49826* (2015.01)

(58) Field of Classification Search
CPC ............. G01K 1/08; G01K 1/12; G01K 1/14
USPC .............. 374/163, 179, 185, 208, 100, 141; 73/866.5
See application file for complete search history.

(56) References Cited

U.S. PATENT DOCUMENTS

| | | | | |
|---|---|---|---|---|
| 2,450,263 A * | 9/1948 | Wise | | 338/28 |
| 3,061,806 A * | 10/1962 | Stevens | | 338/28 |
| 3,463,011 A * | 8/1969 | Ries Werner et al. | | 73/742 |
| 3,619,299 A * | 11/1971 | Weinmann et al. | | 136/228 |
| 3,653,262 A * | 4/1972 | Ehrenfried et al. | | 374/142 |
| 4,206,632 A * | 6/1980 | Suzuki | | 73/40.5 R |
| 4,217,463 A * | 8/1980 | Swearingen | | 136/232 |
| 4,317,353 A * | 3/1982 | Geppelt et al. | | 72/299 |
| 5,152,608 A * | 10/1992 | Dutcher et al. | | 374/125 |

(Continued)

FOREIGN PATENT DOCUMENTS

| | | |
|---|---|---|
| CN | 101336368 A | 12/2008 |
| CN | 101960264 A | 1/2011 |

(Continued)

OTHER PUBLICATIONS

M.M. Zdravkovich, "Review and Classification of Various Aerodynamic and Hydrodynamic Means for Suppressing Vortex Shedding". 1981. Journal of Wind Engineering and Industrial Aerodynamics, 7, 145-189. Elsevier Scientific Publishing Company, Amsterdam—Printed in The Netherlands. 45 pages.

(Continued)

*Primary Examiner* — Gail Kaplan Verbitsky
(74) *Attorney, Agent, or Firm* — Westman, Champlin & Koehler, P.A.

(57) ABSTRACT

A sensor tube for protecting a sensor inserted into a moving process fluid is provided. The sensor tube includes a process interface section for mounting to a process vessel and an extended section extending from the process interface section to a sealed end. The extended section includes a twisted section having a longitudinal axis. The process interface section and the extended section define a sensor bore configured to receive a sensor therein. The twisted section has a cross section that includes at least three equally sized walls and wherein the walls form helixes along the longitudinal axis of the twisted section.

20 Claims, 5 Drawing Sheets

(56) References Cited

U.S. PATENT DOCUMENTS

| | | | |
|---|---|---|---|
| 5,410,808 A * | 5/1995 | Geppelt et al. | 29/890.036 |
| 5,483,041 A * | 1/1996 | Peck et al. | 219/390 |
| 7,004,626 B1 * | 2/2006 | Giberson et al. | 374/179 |
| 7,836,780 B2 | 11/2010 | Garnett et al. | |
| 8,424,396 B2 * | 4/2013 | Knight | 73/864.73 |
| 2004/0233969 A1 | 11/2004 | Welker | |
| 2007/0068894 A1* | 3/2007 | Iwashita et al. | 215/382 |
| 2008/0307901 A1 | 12/2008 | Knight | |
| 2009/0211368 A1 | 8/2009 | Garnett et al. | |
| 2011/0054822 A1 | 3/2011 | Bauschke et al. | |
| 2012/0250722 A1* | 10/2012 | Barfoot et al. | 374/1 |
| 2013/0142216 A1 | 6/2013 | Kleven | |
| 2013/0208259 A1* | 8/2013 | Graham et al. | 356/32 |

FOREIGN PATENT DOCUMENTS

| | | |
|---|---|---|
| EA | 200870032 A1 | 4/2009 |
| EA | 015862 A1 | 12/2011 |
| EP | 1969331 | 9/2008 |
| GB | 2433116 A | 6/2007 |
| GB | 2433122 A | 6/2007 |
| JP | 6-213694 | 8/1994 |
| JP | 2000-110824 | 4/2000 |
| WO | WO 02/072995 | 9/2002 |
| WO | WO 2007/066128 | 6/2007 |

OTHER PUBLICATIONS

Notification of Transmittal of the International Search Report and the Written Opinion of the International Searching Authority, or the Declaration for International Appln. No. PCT/US2012/062559, filed Oct. 30, 2012. 11 pgs.

Zdravkovich, M.M. "Review and Classification of Various Aerodynamic and Hydrodynamic Means for Suppressing Vortex Shedding," Journal of Wind Engineering and Industrial Aerodynamics, 7 (1981), pp. 145-189.

Communication pursuant to Rules 161(1) and 162 EPC for European Patent Application No. 12787275.2-1557, dated Jul. 8, 2014, 2 pages.

First Official Action dated Apr. 2, 2014 in related Chinese Patent Application No. 201210333484.2, 11 pgs. including English Translation.

Patent Examination Report No. 1 from Australian Application No. 2012346409, dated Sep. 9, 2014.

Second Office Action for Chinese Patent Application No. 201210333484.2, dated Sep. 28, 2014, 18 pages.

Office Action from Russian Patent Application No. 2014126569, dated Feb. 20, 2015.

"High-Temperature Thermocouple", Rosemount, Product Data Sheet 00813-0601-2654, Rev. 1, Oct. 1999.

Office Action from Japanese Patent Application No. 2014-544740, dated Jul. 28, 2015.

* cited by examiner

TWISTED SENSOR TUBE

CROSS-REFERENCE TO RELATED APPLICATIONS

The present application is based on and claims the benefit of U.S. provisional patent application Ser. No. 61/565,765, filed Dec. 1, 2011, the content of which is hereby incorporated by reference in its entirety.

BACKGROUND

The present invention relates to a sensor tube, such as a thermowell, used in measuring a fluid variable in a process. More specifically, the present invention relates to a sensor tube configuration that achieves vortex shedding reduction using a simple manufacturing technique.

Process fluid temperature is an important physical parameter that is often used to control or otherwise monitor a process. A process fluid temperature is typically measured using a temperature sensor, such as a resistance temperature device (RTD), thermocouple or thermistor. The temperature sensor itself is generally not able to withstand direct contact with a process fluid. Thus, a thermally conductive sensor tube, such as a thermowell, is used to interface with the process fluid while protecting the temperature sensor. The process fluid directly contacts the thermowell and heat from the process fluid transfers through the thermowell to the temperature sensor disposed therein. In this manner, the temperature sensor can accurately measure process fluid temperature without directly contacting the process fluid. A thermowell allows replacement of the temperature sensor without having to break the process seal.

Since sensor tubes and thermowells are directly inserted into the process, they are subject to a number of stresses. When thermowells are used in pipes or tanks, they suffer from high fatigue stresses caused by vortex shedding. This vortex shedding occurs at specific frequencies as determined from the Strouhal Number. The Strouhal Number is approximately 0.22 and does vary slightly with Reynolds Number. The Strouhal Number is $f_s d_m/V$, where $f_s$ is the shedding frequency, $d_m$ is the diameter of the cylindrical thermowell and V is the flow stream velocity. When the shedding frequency is close to the natural frequency of the thermowell, the thermowell will violently vibrate at its natural frequency and exceed fatigue stress limits. Generally two velocities are of concern, the largest stresses are caused by crossflow vibration which is the frequency given by the Strouhal Number. There is a second velocity that is of concern is ½ the velocity given by the Strouhal Number. This velocity causes the thermowell to vibrate inline with the flow and is caused by the vortices shed from each side of the thermowell where forces at twice the shedding frequency are generated. This vibration mode usually generates less stress than the crossflow condition, but it still can cause the thermowell to fail in fatigue.

Thermowell designs are usually checked by the requirements of ASME PTC 19.3 TW-2010 and give acceptable flow velocities for the conditions specified. The inline vibration mode is checked for stress levels in vortex frequencies 0.4 to 0.6 of the lowest natural frequency of the thermowell. Some applications in this velocity range will be unacceptable due to fatigue stress levels. This standard requires vortex frequency in all applications to be below 0.8 of the natural frequency.

In some circumstances, vortex shedding forces can lead to breakage of the thermowell due to fatigue stress failure and therefore, loss of pressure containment and potential damage to down stream components due to an unattached part in the pipe.

Some attempts have been made to reduce vortex shedding from thermowells. For example, it is known to attach helical strakes to a thermowell to reduce vortex shedding. United States Patent Publication 2008/0307901 A1 by Jeremy Knight also shows a thermowell or a gas sampling tube with helical strakes attached. Further methods for reducing vortex shedding can be found in a paper by M. M. Zdravkovich entitled, "Review and classification of various aerodynamic and hydrodynamic means for suppressing vortex shedding" Journal of Wind Engineering and Industrial Aerodynamics, 7 (1981) pp. 145-189.

Providing an easily manufacturable sensor tube with effective vortex shedding reduction would represent an important advance to the art of measuring process fluid variables when the process fluid is flowing or otherwise in motion.

SUMMARY

A sensor tube for protecting a sensor inserted into a moving process fluid is provided. The sensor tube includes a process interface section for mounting to a process vessel and an extended section extending from the process interface section to a sealed end. The extended section includes a twisted section having a longitudinal axis. The process interface section and the extended section define a sensor bore configured to receive a sensor therein. The twisted section has a cross section that includes at least three equally sized walls and wherein the walls form helixes along the longitudinal axis of the twisted section.

DETAILED DESCRIPTION

Embodiments of the present invention eliminate or significantly reduce the forces caused by vortex shedding on a thermowell or other device inserted into a flow stream of gases, liquids or other fluids. The elimination or reduction of vortex shedding is accomplished, in one embodiment, by using a square tube or rod and twisting the tube or rod. More specifically, the rod or tube is preferably twisted in a pitch of 1 turn per 8-16 widths of the square or 1 turn per 5.5-11 diagonal widths to make a spiral shaped tube. This configuration is easier to manufacture and more rugged than previous methods for avoiding vortex shedding stresses.

Figure 1:
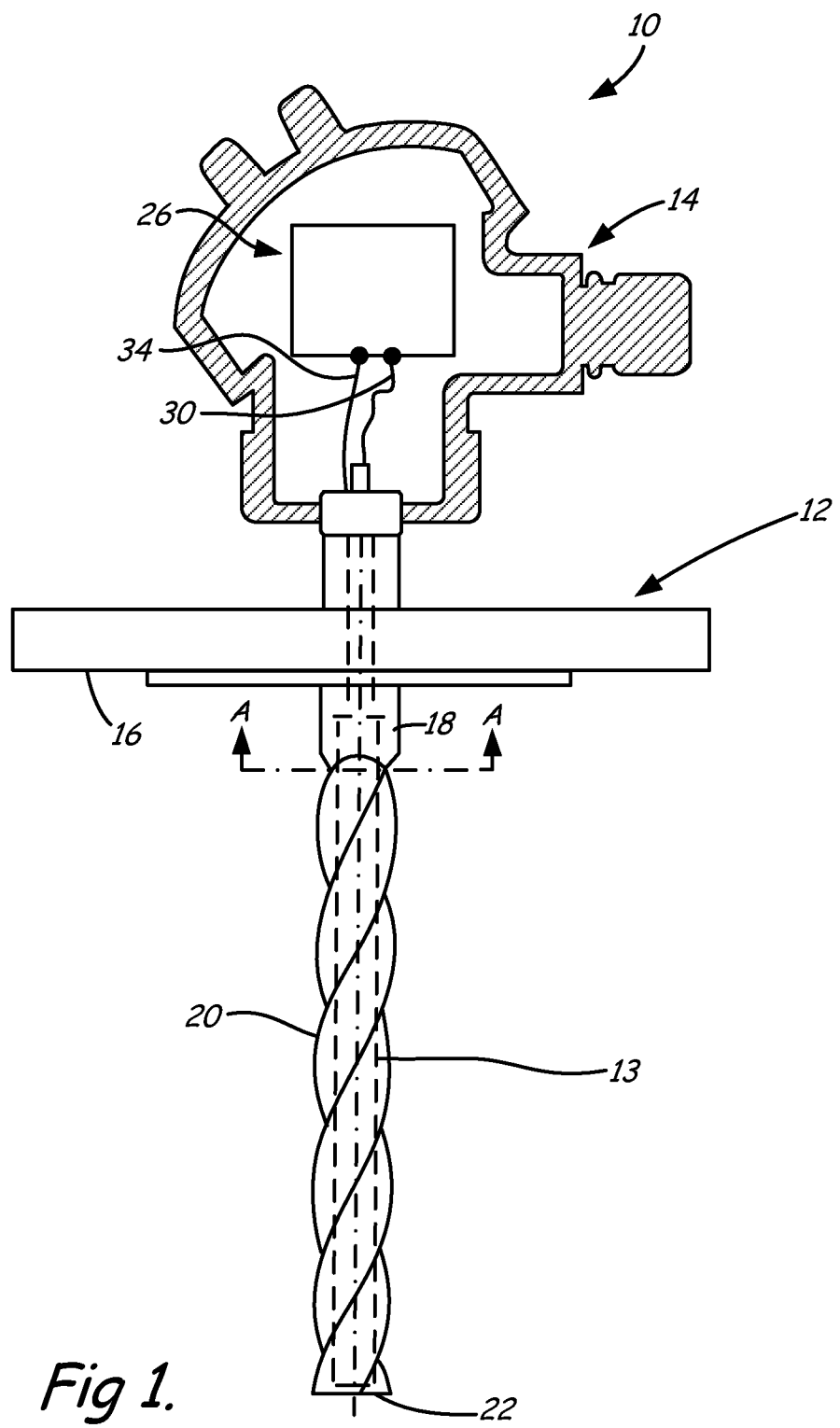
FIG. 1 is a diagrammatic view of a process fluid temperature measurement system including a twisted thermowell in accordance with an embodiment of the present invention.

FIG. 1 is a diagrammatic view of a process fluid temperature measurement system including a twisted thermowell in accordance with an embodiment of the present invention. Temperature measurement system 10 includes a thermowell 12 having a temperature sensor 13 disposed therein. As set forth above, temperature sensor 13 may be any suitable sensor and generally has a cylindrical shape that is received in a lengthwise bore within thermowell 12. Conductors 30, 34 of temperature sensor 13 are coupled to suitable circuitry 26 within temperature transmitter 14 in order to measure the temperature and provide an indication thereof to a process controller or other suitable device. An example of a suitable temperature transmitter is the Model 644 Head Mount Temperature Transmitter available from Emerson Process Management of Chanhassen, Minn.

Thermowell 12 preferably includes a process sealing flange 16 that is able to attach and seal to a process vessel such as a pipe or tank. Thermowell 12 includes round section 18 that passes through process interface section 16, illustrated as a flange in FIG. 1. Round section 18 is preferably welded to flange 16 for strength and for pressure sealing. Thermowell 12 includes an extended section including a twisted section 20 extending from round section 18 to sealed end 22 of thermowell 12. There is a center hole or longitudinal bore that runs the length of thermowell 12 for insertion of temperature sensor 13. In one embodiment, the cross-section of twisted section 20 is a square and the twist rate or pitch of section 20 is 1 turn per 8-16 widths of the section or 1 turn per 5.5-11 diagonal widths of the square. (The square diagonal would be the cylinder diameter if made from a cylinder). The square corners provide a rugged surface that is exposed to the flow versus the more fragile helical strakes. The square section could go through the flange and be welded to the flange if the square section is left untwisted at that location. The flange square hole would be more difficult to manufacture, but can be accomplished. Alternatively the square section could be machined round and put through the flange and welded. Moreover, the twisted portion need not extend the full length of the flow stream from the interface section to the sealed end. It is believed that as long as the twisted portion extends between 40% and 100% of the flow stream that effective results will be achieved.

Figure 2:
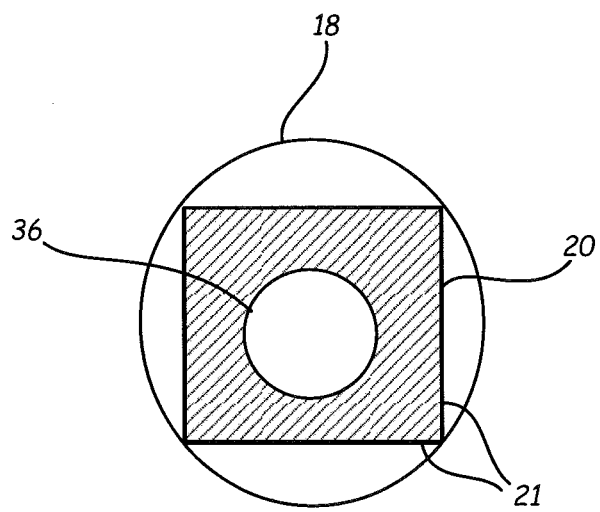
FIG. 2 is a diagrammatic cross section taken along line A-A in FIG. 1.

FIG. 2 is a diagrammatic cross section taken along line A-A in FIG. 1. Twisted section 20 is shown having a cross-section is the shape of a square. The sides (walls) 21 of the square preferably extend to just short of the diameter of round section 18. Bore 36 is defined by process interface section 18 and the twisted section 20 and configured to receive a sensor, such as a temperature sensor, therein. Preferably, bore 36 is centered within twisted section 20 and round section 18 for receiving the sensor. Bore 36 extends to end 22 (shown in FIG. 1) where twisted section 20 is sealed.

Figure 3:
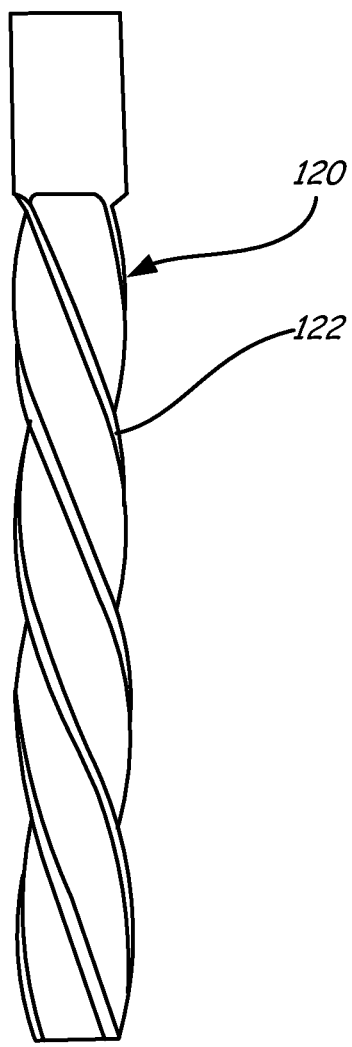
FIG. 3 is a diagrammatic view of a portion of a twisted sensor tube in accordance with another embodiment of the present invention.

FIG. 3 is a diagrammatic view of a portion of a twisted sensor tube in accordance with another embodiment of the present invention. Sensor tube 120 has corners 122 that are thicker than the embodiment shown in FIG. 1. The added thickness may make the corners more rugged and able to wear better over longer periods.

Figure 4A:
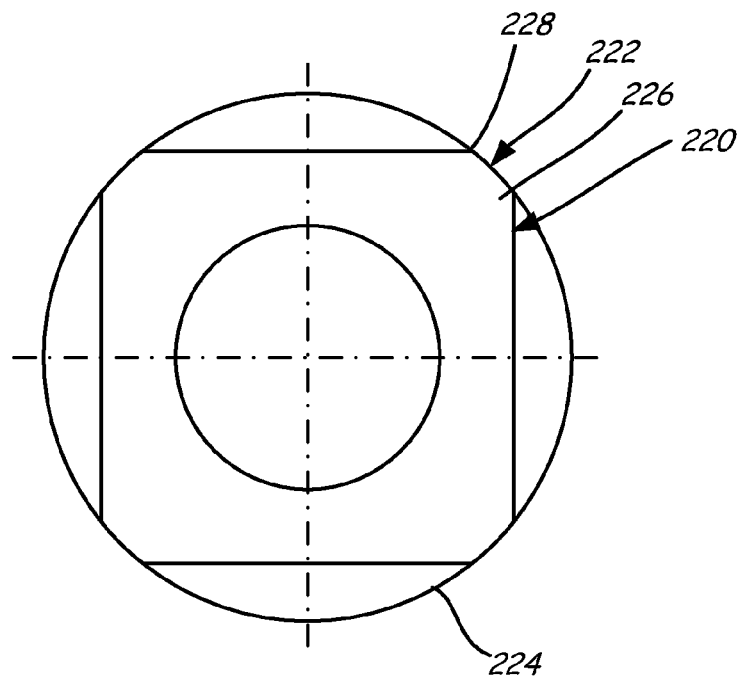
FIGS. 4A and 4B are diagrammatic cross sectional views of twisted sensor tubes in accordance with embodiments of the present invention.
Figure 4B:
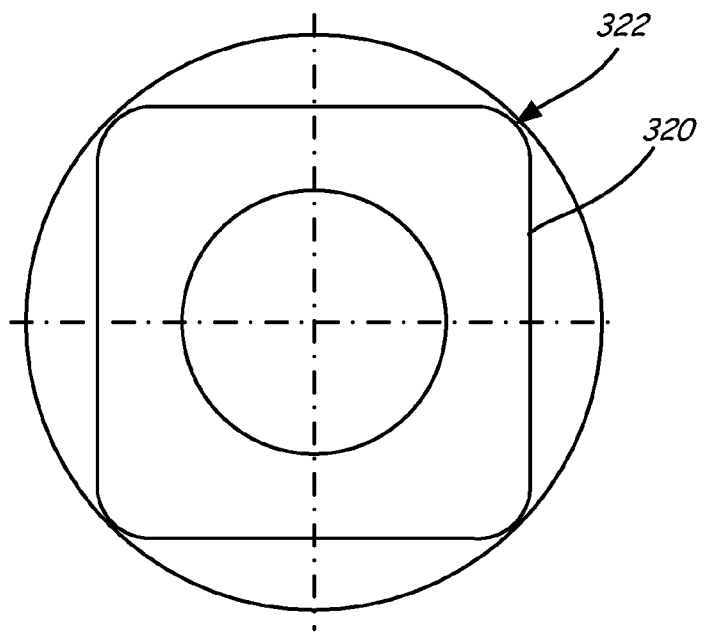

FIGS. 4A and 4B are diagrammatic cross sectional views of twisted sensor tubes in accordance with embodiments of the present invention. FIG. 4A shows a cross section of a twisted portion of sensor tube 220 with corners 222 that have a radius of curvature that matches cylindrical portion 224. This embodiment is particularly advantageous where the rectangular twisted portion is originally machined from a cylindrical piece. The twisted portion can be machined from the cylinder in twisted fashion, or it can be machined first and then twisted. Each corner 222 has a pair of edges 226, 228 that help reduce vortex shedding, while making the corner more rugged. FIG. 4B is similar to FIG. 4A, however, corners 322 of walls 320 are simply radiused before the section is twisted.

Figure 5:
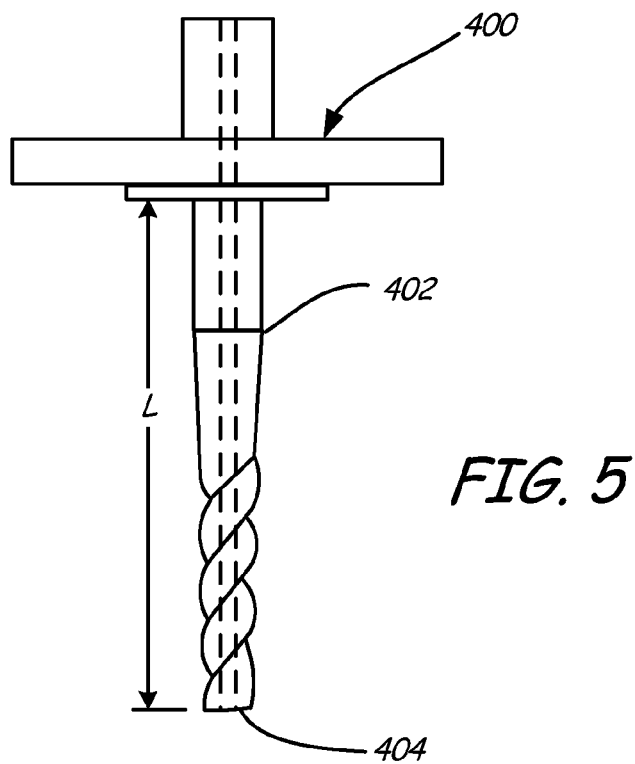
FIG. 5 is a diagrammatic view of a tapered, twisted sensor tube in accordance with an embodiment of the present invention.

FIG. 5 is a diagrammatic view of a tapered, twisted sensor tube in accordance with an embodiment of the present invention. Sensor tube 400 is tapered in that its cross sectional area decreases from location 402 to distal end 404. Sensor tube 400 is also shown with only a portion being twisted. Although not to scale, twisted portion 406 accounts for about 40% of length, L.

Figure 6:
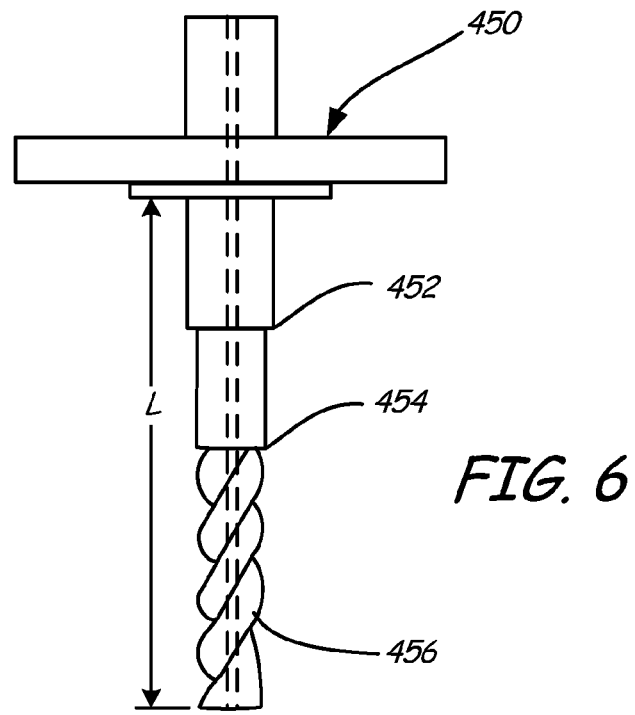
FIG. 6 is a diagrammatic view of a stepped, twisted sensor tube in accordance with an embodiment of the present invention.

FIG. 6 is a diagrammatic view of a stepped, twisted sensor tube in accordance with an embodiment of the present invention. Sensor tube 450 is stepped in that its cross sectional area is reduced in steps at locations 452, 454. Again, only a portion, such as 40%, of length L is twisted, as indicated at reference numeral 456.

Although embodiments of the present invention have been described with respect to a twisted square thermowell, any suitable number of sides equal to or greater than 3 can be used. For example, a twisted triangle, twisted pentagon, or a twisted hexagon shape could also be employed in accordance with embodiments of the present invention. However, it is believed that as the number of sides increases, the effectiveness of the twisted section at reducing vortex shedding will diminish as the overall shape becomes more and more like a cylinder.

In the embodiments described above, the twisted sensor tube or thermowell is generally formed of metal. Metal is particularly useful in that it can be easily machined. Specifically, a square metal thermowell can be easily twisted into the configurations described above. However, metal is not the only material with which embodiments of the present invention are useful. In particular, there are a number of applications where metal would not be appropriate, such as extremely corrosive environments or very high temperature applications. In such instances, other materials such as ceramic could be used. While such materials may not be as amenable to machining as metal, they could still be provided in the configurations described above. For example, a twisted square ceramic thermowell could simply be molded into the desired shape or configuration prior to firing or otherwise curing the ceramic. In embodiments where a plastic of organic material is used, suitable manufacturing methods, such as injection molding, could be employed.

Although many embodiments refer to a twisted section, that language is not intended to require the actual act of twisting to form the section. Instead, it is intended to mean that the cross-section remains a polygon while the edges of the polygon form helixes along the length of the twisted section. Thus, a twisted section could be formed of molded ceramic, injection molded plastic, cast metal, et cetera. The twisted section simply has cross section that includes at least three walls, where the walls are preferably equally sized and where the walls form helixes along the length of the twisted section.

It is believed that embodiments of the present invention provide a number of advantages and synergies. Specifically, the walls of the twisted section are believed to be more robust than strakes which are generally fragile and difficult to manufacture. Additionally, the use of a polygonal thermowell would normally have a specific orientation relative to the fluid flow. However, since the polygonal section is twisted, it is rendered omnidirectional and thus does not require any alignment relative to the flow direction. Further, the utilization of a substantially integral construction does not require any additional or moving parts. Finally, the polygonal edges promote turbulence and therefore increase heat transfer which may reduce the time constant, self heating and conduction error for thermowell embodiments.

Although the present invention has been described with reference to preferred embodiments, workers skilled in the art will recognize that changes may be made in form and detail without departing from the spirit and scope of the invention. For example, while embodiments of the present invention have been described with respect to a sensor tube, they may be applicable to automobile antennas, large under-sea piping and piers, or other contexts where vortex shedding reduction is desired. Thus, anytime a sensor or other structure must be inserted or otherwise present in a fluid (liquid or gas) and there is relative motion between the fluid and sensor or other structure and vortex shedding is not desired, embodiments of the present invention may be useful.

What is claimed is:

1. A sensor tube for protecting a sensor inserted into a moving process fluid, the sensor tube comprising:
    a process interface section for mounting to a process vessel;
    an extended section side/wall extending from the process interface section to a sealed end, the extended section including a twisted section which is twisted around a longitudinal axis;
    wherein the process interface section and the extended section define a sensor bore configured to receive a sensor therein; and
    wherein the twisted section has a cross section that includes at least three equally sized walls which define a polygon and wherein the walls form helixes along the longitudinal axis of the twisted section.

2. The sensor tube of claim 1, wherein the sensor tube is a thermowell.

3. The sensor tube of claim 1, wherein the cross section is a square.

4. The sensor tube of claim 1, wherein the sensor tube is formed of metal.

5. The sensor tube of claim 1, wherein the sensor tube is formed of ceramic.

6. The sensor tube of claim 1, wherein the sensor tube is formed of plastic.

7. The sensor tube of claim 1, and further comprising a sensor disposed in the sensor bore, the sensor having an electrical characteristic that varies with a process variable.

8. The sensor tube of claim 7, and wherein the sensor is a temperature sensor and further comprising a temperature transmitter coupled to the sensor.

9. The sensor tube of claim 1, wherein the twisted section has a pitch that is approximately 1 turn per 8-16 widths of one of the equally sized walls.

10. The sensor tube of claim 1, wherein the walls join together at radiused corners.

11. The sensor tube of claim 1, wherein the sensor tube is a tapered sensor tube.

12. The sensor tube of claim 1, wherein the sensor tube is a stepped sensor tube.

13. The sensor tube of claim 1, wherein a length of the extended section comprises the twisted section.

14. The sensor tube of claim 1, wherein the cross section includes four equally sized walls.

15. A thermowell having a longitudinal axis and being insertable into a process fluid vessel to an insertion length, the thermowell comprising:
    a process interface for passing through a wall of the process vessel and sealing to the process vessel; and
    a twisted portion fixedly connected to the process interface and having a polygonal cross section that is twisted around the longitudinal axis;
    wherein polygonal cross section includes at least three adjacent walls; and
    wherein the walls form helixes along the longitudinal axis of the twisted portion.

16. The thermowell of claim 15, wherein the polygon has corners that have a radius of curvature.

17. The thermowell of claim 15, wherein the twisted portion extends between about 40% and 100% of the insertion length.

18. The thermowell of claim 17, wherein the twisted portion extends from a distal end of the thermowell.

19. A method of manufacturing a sensor tube, the method comprising:
    providing a process interface section for mounting to a process vessel;
    coupling an extended section to the process interface section, the extended section extending from the process interface section to a sealed end and having a cross section which forms a polygon wherein the polygon cross section includes at least three adjacent walls; and
    generating a twisted section in the extended section by twisting the end section of the section around a longitudinal axis with respect to the process interface section.

20. The method of claim 19, wherein generating the twisted section includes physically twisting the twisted section relative to the process interface section.

* * * * *